Figure 1:
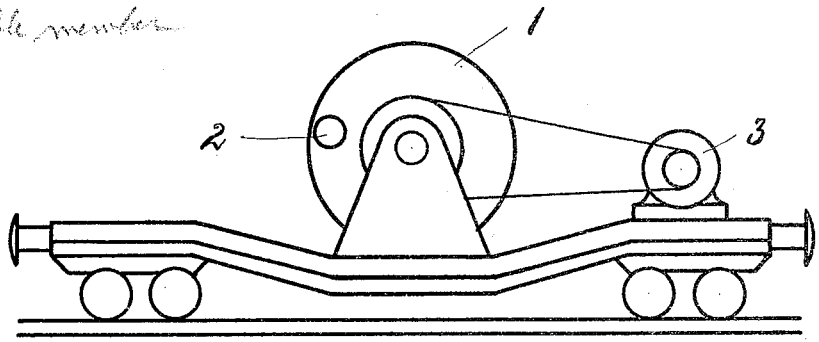

Aug. 16, 1932.  W. SPÄTH  1,871,756
MEANS FOR EXAMINING STRUCTURES
Filed Feb. 24, 1928

Patented Aug. 16, 1932

1,871,756

UNITED STATES PATENT OFFICE

WILHELM SPÄTH, OF BARMEN, GERMANY

MEANS FOR EXAMINING STRUCTURES

Application filed February 24, 1928, Serial No. 256,787, and in Germany December 18, 1926.

Mechanical elements, such as supports, beams, chains, crank-shafts, or structures composed of such elements, as bridges, transmissions, conveying apparatus, etc. are frequently subjected to strains due to vibrations.

The vibrations under equal conditions show a certain similarity, which is an indication as to the uniform character of various modifications of the same mechanical element or structure, or an indication as to the uniformly maintained character of one and the same mechanical element or structure.

Now, this inventive concept extends further in that mechanical elements or structures are artificially set to vibrate and the phenomena occurring during such vibrations are used as the characteristic feature of the element or structure. By corresponding measurements the uniform condition or character of similar mechanical elements or structures or the uniformly maintained condition of one and the same mechanical element or structure can be ascertained.

More especially, it is of advantage, to measure the behavior of the element or structure in dependence on the frequency of the artificially produced impulses of vibration or oscillation. In that case, for instance, the amplitude of the oscillations at variable frequency is determined whereby resonance curves of the element or structure are obtained. These resonance curves furnish a valuable characteristic as to the behavior of a mechanical element or structure, and such curves can be taken for any desired oscillations, that is to say, tensile and compressive oscillations, bending or torsional oscillations.

From the resonance curves can be deducted the size of the damping of the various ranges of resonance, for instance, as regards lower and upper oscillations. The energy losses are principally determined by two factors. One factor depends on losses in the material itself, while the other consists of external friction losses. By measuring the damping, one can thus gain in a simple manner a deep insight into the state of a mechanical element or structure, and especially, changes which can become a danger to the operation, can be readily ascertained.

Furthermore, important deductions can be made from the position of the resonance points and their displacement, because, for instance, a loosening or an incipient fracture results in a decrease of the elastic force and therewith a reduction in the number of inherent oscillations.

Moreover, according to this method, the effective active mass of oscillating elements or structures, which determines the oscillations, can be determined. If $m$ indicates the effective mass in an oscillation and $c$ the elasticity, the oscillation frequency in $2\pi$ seconds is:

$$\omega = \sqrt{\frac{c}{m}}.$$

Now, if an additional weight $\Delta m$ of known value suited to the special conditions is placed at the point of the greatest oscillations, the inherent frequency is reduced. If the frequencies before and after the addition of the additional weight are $w_1$ and $w_2$, then $$\frac{\Delta m}{m} = \left(\frac{w_1}{w_2}\right)^2 - 1$$

from which the oscillating mass $m$ can be determined.

Thus, also the elastic force $c$ of the element or structure can be computed, and these important factors for judging a mechanical element or structure, or their variations by any influences can be ascertained.

Furthermore, if $\delta$ indicates the logarithmic decrement of the damping and $a$ the amplitude of the oscillations, the capacity of vibration destroyed per second during the oscillation can be ascertained as $$L = \frac{\delta}{2\pi} w^3 \cdot a^2 \cdot m$$

or $$L = \frac{\delta}{2\pi} w \cdot a^2 \cdot c.$$

Similar equations can be made up for the various kinds of oscillations. In these equations, all the factors are known by the measurements according to the present method, so that the capacity of vibration destroyed in an element or structure can be stated. The size of this capacity or its dependence on various influences is a further important factor.

Furthermore, it is possible to obtain a characteristic depending on the frequency by the measurement of the capacity of vibration of the operating parts, which are used for the artificial production of the oscillations.

By measuring and evaluating the results in dependence on important operating conditions, one can gain further insight into the state or condition of a mechanical element or structure. Such measurements are especially valuable as controlling or checking measurements at definite time intervals, so that the changes which occurred between the various measurements can be determined. In a similar manner, the effects, for instance, of various temperatures, the dependence on the extent of exciting impulses or of changes suffered by the element or structure by special occurrences, can be determined.

For a thorough characterization of mechanical structures, e. g. bridges, it is furthermore of advantage to make such measurements in dependence on a mass connected with said structure and the position of which mass varies, thus, for instance, in the case of a bridge, to determine the dynamic state of oscillation depending on the position of a train which has rolled onto the bridge.

Various means may be used for producing the periodic impulses, said means depending on the special conditions. The invention may be more fully explained with the aid of some examples, shown in the annexed drawing, in which the figure shows a means for examining bridges.

In the device for examining bridges according to Fig. 1, the effect of centrifugal forces is used for producing oscillations.

1 is a fly-wheel carrying eccentrically a mass 2 and adapted to be set in rotation by a suitable operating means indicated at 3. The entire device is preferably mounted on a wheel truck, is rolled onto the bridge to be examined and secured in position. For the purpose of examining the bridge the fly-wheel, is set in rotation, the number of revolutions being gradually varied. To enable the oscillations to be produced in several directions, the fly-wheel, must be so mounted that it can be turned to rotate in different planes. By suitable means the angle of oscillation of the bridge produced by each number of revolutions of the operating device is measured along various points of the bridge.

I claim:

1. A device for examining mechanical structures comprising a vehicle adapted to be moved onto and secured in a definite position on a structure to be examined so that impulses imparted to the vehicle will be transmitted to the structure, and means mounted on said vehicle for imparting impulses of known amplitude and frequency thereto while the device remains in a definite position on the structure to which it is secured, whereby the reaction of the structure to the impulses of the device affords a ready means of testing the structure.

2. A device for examining mechanical structures comprising a vehicle adapted to be moved onto and secured in a definite position on a structure to be examined so that impulses imparted to the vehicle will be transmitted to the structure, an unbalanced rotatable member mounted on said vehicle and adapted to be rotated to impart impulses of known amplitude and frequency to the vehicle, while the device remains in a definite position on the structure to which it is secured, whereby the reaction of the structure to the impulses of the device affords a ready means of testing the structure, and means for rotating said member.

In testimony whereof I affix my signature.

WILHELM SPÄTH.